Sept. 2, 1947. A. H. GEE 2,426,733
COMBINATION DRIP STOPPER
Filed Sept. 9, 1944 2 Sheets-Sheet 1

INVENTOR.
Albert Haldane Gee
BY John H. Leael
ATTORNEY

Sept. 2, 1947.  A. H. GEE  2,426,733
COMBINATION DRIP STOPPER
Filed Sept. 9, 1944  2 Sheets-Sheet 2
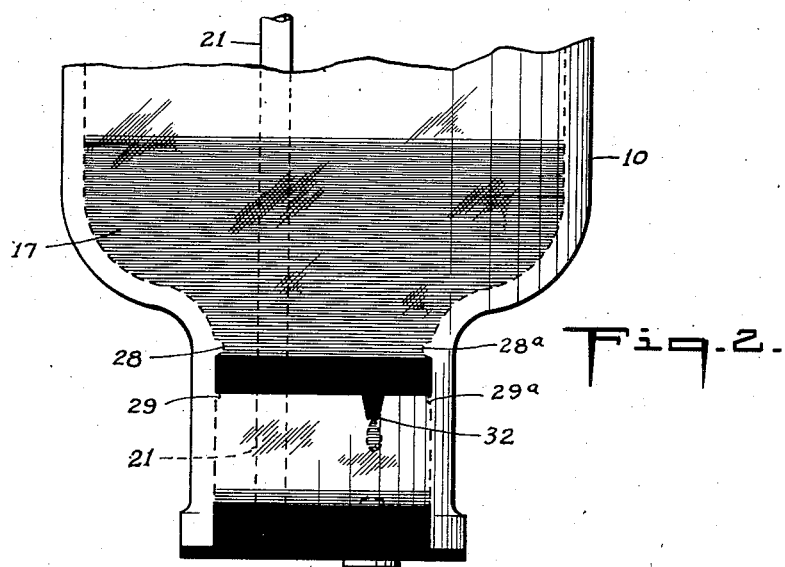
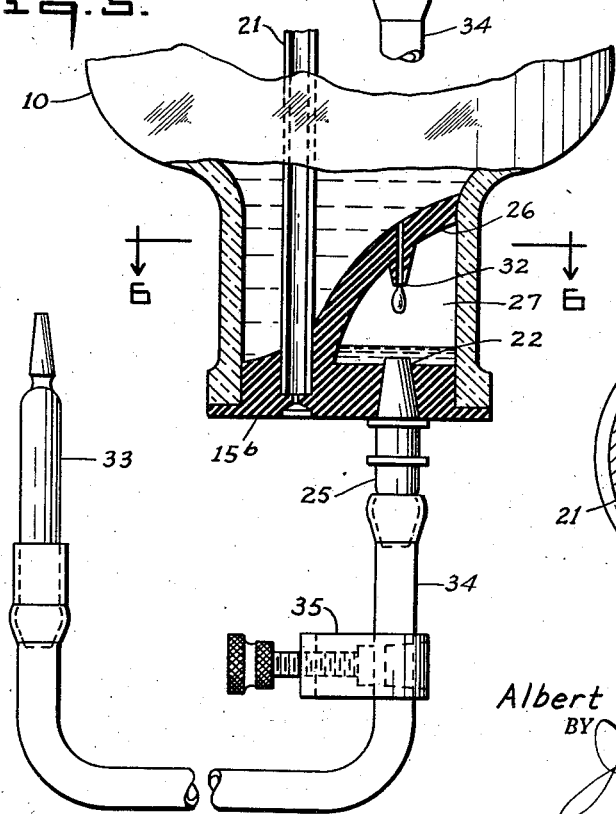
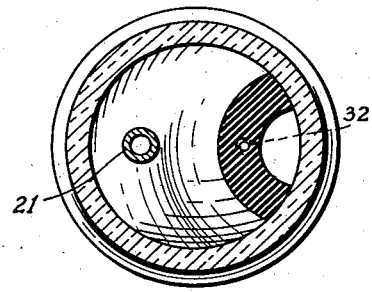
INVENTOR.
Albert Haldane Gee
BY John M. Looch
ATTORNEY Patented Sept. 2, 1947

2,426,733

UNITED STATES PATENT OFFICE 2,426,733

COMBINATION DRIP STOPPER

Albert Haldane Gee, New York, N. Y., assignor, by mesne assignments, to William R. Warner & Co., Inc., New York, N. Y., a corporation of Delaware Application September 9, 1944, Serial No. 553,377

6 Claims. (Cl. 128—214)

The present invention relates to dispensing apparatus particularly adapted for the administration of medicinals and nutrients. Heretofore apparatus employed for the parenteral administration of solutions has generally included a separate instrumentality known as a drip meter for visually indicating to the physician or other operator the flow rate of the solutions into the patient in order that the rate of infusion could be accurately controlled. The practice of mounting the drip meter between the container for the liquid and the injection needle in series with the tubing has necessitated great care and inconvenience in assembling the equipment besides resulting in a high breakage rate with frequent injury to operators.

It is the main object of the present invention to remove all the disadvantages heretofore associated with the use of drip meters in connection with apparatus for the administration of fluids.

A further object of the present invention is to eliminate the necessity of utilizing a drip meter as a separate instrumentality in connection with apparatus for the administration of fluids.

A further object of the present invention is to provide an apparatus for the administration of solutions wherein the flow rate of the solution may be observed through a transparent section of the container itself which forms part of the drip chamber.

A further object of the present invention is to provide an apparatus adapted for the administration of relatively opaque fluids.

A further object of the present invention is to provide an apparatus for administering fluids in which a container for the fluid to be administered and the flow indicating device are packaged and sold as a unit which requires no positioning of the flow indicating device relative to the container prior to use.

A further object of the present invention is to provide a combination closure and drip meter for fluid dispensing apparatus.

A still further object of the present invention is to provide a drip meter for the visual indication and control of solution flow rate that is especially characterized by simplicity of construction and arrangement, ease of assembly and safety to operators.

Other objects and advantages of construction of the apparatus, if not specifically pointed out, will be apparent to those skilled in the art upon recourse to the following detailed description of what is at present considered the preferred embodiment of the invention, taken in connection with the accompanying drawing.

For a more detailed description of the invention reference is made to the attached drawings in which:

Fig. 2 is a side elevation partly broken away of the apparatus of Fig. 1 shown in the dispensing of opaque liquids.

Fig. 5 is an elevation partly broken away to show a sectional view of a further modification of the flow indicating chamber.

Fig. 6 is a horizontal section of the modification of Fig. 5.

The present invention in general comprises a dispensing apparatus of the type employed in the administration of fluids to a patient comprising a flow indicating chamber mounted within the fluid receptacle, said chamber being at least partially confined by a transparent wall of the fluid receptacle so as to facilitate visual indication of the liquid flow rate during the dispensing operation.

Figure 1:
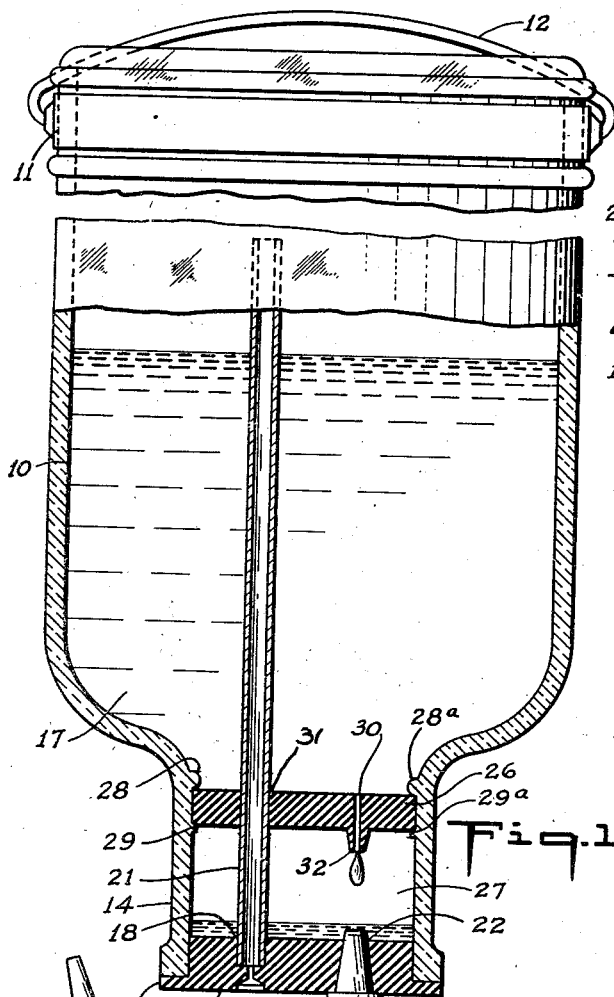
Fig. 1 is an elevational view of the entire dispensing apparatus in inverted dispensing position shown partly in section to illustrate more clearly the construction of the flow indicating chamber.
Figure 3:
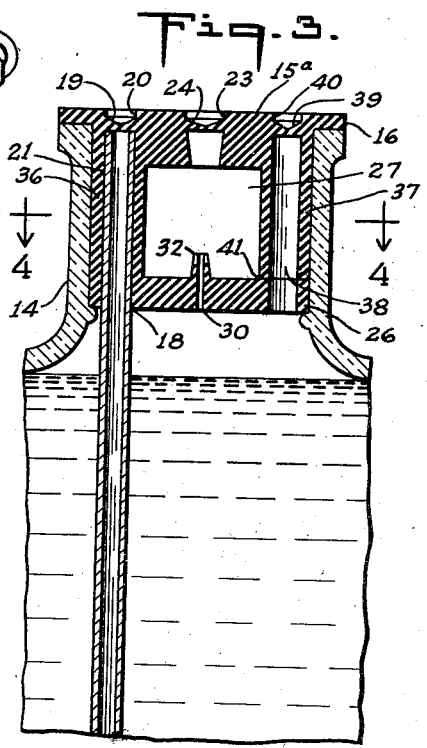
Fig. 3 is a vertical cross sectional view of a modified form of flow indicating chamber.
Figure 4:
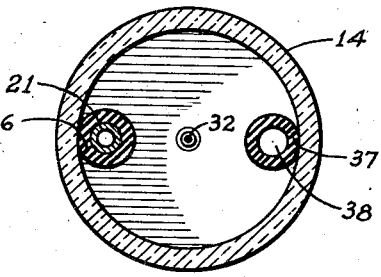
Fig. 4 is a horizontal section of the flow indicating chamber shown in Fig. 3.

Referring now to the drawings and more particularly to Figures 1 and 3, the apparatus comprises a container 10 for the liquid medicament or nutritional solution which is to be injected into the blood stream of the patient, which is shown for purposes of illustration in an inverted dispensing position. The lower end of the container, which in the drawing for the purpose of explanation is shown as a glass bottle, is provided with a metal band 11 to which is pivotally connected a wire bail 12 by which the container 10 can be mounted in inverted position upon a support which may be any suitable hook, preferably located at an elevated position relative to the patient. The container 10 is provided with a neck 14 whose open end is closed by a closure 15 which may be made of rubber or any other suitably resilient material. The closure 15 includes a body portion which snugly fits into the open neck 14 and an outwardly extending flange 16 which seats on the upper end of the neck 14 of the container, the construction of the closure with relation to the container neck being such that it hermetically seals the liquid contents 17 of the container within the container prior to use.

The closure 15 is further provided with an opening 18 which extends from the inner end of the closure to a point near the outer surface of the closure, where prior to the dispensing operation it is closed by a relatively thin wall 19 as shown in the modification of Fig. 3, which separates the opening from a depression 20 formed within the top of the closure. A vent tube 21 is snugly seated within the opening 18 for a purpose which will be later described. The closure 15 is provided likewise with an outlet opening 22 extending from the inner end of the stopper to a point near the outer surface thereof where prior to the dispensing operation it is separated from a depression 23 formed in the top of the stopper by a relatively thin wall 24. With the container inverted to the fluid dispensing position shown in Figure 1, the wall 24 has been punctured by a connector 25 which is frictionally held in the outlet 22 and the wall 19 has been manually punctured to admit air to the upper surface of the liquid 17.

The neck portion of the container is provided with a partition 26 preferably formed of similar material to the closure 15 which is spaced from the outlet 22 so as to form a chamber 27 between the body of liquid and the closure 15. The partition fits snugly between projections 28, 28a and projections 29, 29a formed on the interior of the neck portion 14 which limit the inward movement of the partition during assembly on the one hand and resist any tendency of the partition to become displaced under the influence of hydrostatic pressure when the container is inverted to dispensing position on the other.

An opening 31 is formed in the partition 26 for the vent tube 21. A further and more restricted opening 30 is formed in the partition 26 terminating in a nozzle 32 which depends into the chamber 27 for a purpose to be hereinafter described.

An injection needle 33 communicates with the connector 25 through tubing 34 and the flow of fluid being administered may be controlled by any suitable type of clamp valve 35.

The dispensing apparatus of the present invention may be first filled to some desired point with the liquid, after which the air is evacuated from the unfilled space of the bottle to any desired extent and the partition 26 together with the stopper 15 and vent tube 21, which have been previously assembled, are inserted into the bottle to hermetically seal the same.

In preparation of the apparatus for use, the operator suitably moistens the thin walls 19 and 24 and then pushes the stem of the connector 25 to which the tubing 34 and the injection needle 33 have been attached, through the thin wall 24. The action of forcing the connector stem into the resilient stopper expands the opening 22 so that when the pressure is released and the container inverted, there is sufficient frictional resistance to prevent accidental withdrawal of the connector 25 from the stopper under the combined weight of the tubing and clamp valve.

The operator then punctures the thin wall 19 by any suitable instrumentality, such as a hollow needle so as to permit communication with the atmosphere and vent tube 21 to allow the air to pass up through the tube 21 to the space above the liquid 17 when the container is inverted to facilitate the free passage of the liquid out of the container. The container is then inverted and suspended by bail 12 at any desired position above the point of injection of the liquid into the veins of the patient to provide the proper hydrostatic head on the liquid.

When the container has been mounted in the inverted position and after the needle 33, which has any desired construction, is inserted into the vein of the patient, the rate of passage of the liquid into the veins in controlled by any suitable clamp valve 35.

The liquid leaving the bottle passes through the restricted opening 30 in the partition 26 to the nozzle 32 where it is formed into drops and deposits in the bottom of the drip chamber, thereafter passing from the drip chamber via the connector 22 to the tubing 34 and into the patient through the injection needle 33. Since an air tight seal is maintained in the drip chamber 27, the rate of flow through the restricted opening 30, will be controlled by the adjustment of the clamp valve 35.

A noteworthy advantage of the arrangement provided by the present invention is that the flow rate may be observed irrespective of the relative opacity of the solution and in spite of the fact that the indicator is mounted within and forms a part of the container for the solution to be administered. The suitability of the apparatus for the administration of opaque fluids such as blood, is illustrated in Figure 2 of the drawings.

An arrangement in which the flow indicating device forms an integral part of the container closure itself is shown in Fig. 3 in which the partition 26 is connected to the closure 15a by means of the standards 36 and 37 to form the flow indicating chamber 27 which is confined on the sides by the transparent container wall.

In the form of the present invention shown in Fig. 3 the vent tube opening 18 extends completely through the standard 36 thereby eliminating the need of a separate opening through the partition 26.

The closure 15a may if desired be provided with an additional opening 38 which extends from the lower end of the closure through the standard 37 to a point near the outer surface of the stopper where it is closed by a relatively thin wall 39 which separates the opening from a depression 40 formed within the top of the stopper. The standard 37 is severed from the partition 26 as at 41 in order to provide for stripping the stopper after molding to form the drip chamber 27 and thus to obviate the need for a loose or separable core in the mold.

In the modification shown in Fig. 5 the partition 26 in integral with the stopper 15b on one side thereof and inclined upwardly therefrom and bent over into the form of a semi-circle which abuts against the wall of the container 10 in fluid sealing engagement to form a flow indicating chamber 27, said chamber being on one side confined by a transparent wall of the container 10.

The operation of the dispensing apparatus shown in Figures 3 to 6 inclusive is identical with that described hereinbefore with respect to Figure 1.

In the three specific embodiments of the present invention herein described for purposes of illustration the flow indicating chamber is formed in part of a container section thereby enabling the flow rate of the solution being administered to be readily and conveniently observed irrespective of the opacity of the solution.

A principal advantage of this arrangement is to eliminate the necessity of the convential glass drip meter chamber while utilizing the container wall to provide visual indication of the solution flow rate.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim:

1. A dispensing apparatus for administration of fluid to a patient, comprising a receptacle which is at least in part transparent and substantially all of which is capable of receiving liquid to be dispensed, a closure for said receptacle, means forming an outlet through said closure, means forming a partition between said outlet and said body of liquid when the receptacle is inverted, said means engaging a transparent wall of the receptacle at a point spaced from said closure to form a drip chamber, a nozzle disposed in said partition whereby liquid from the said body flowing from the nozzle at a rate insufficient to provide continuous flow will leave the nozzle in the form of drops which are visible through the transparent wall of said chamber, and means providing for the admission of air through said closure to a point above the said body of liquid to permit the drops to issue from the nozzle.

2. A dispensing apparatus for administration of fluid to a patient, comprising a receptacle which is at least in part transparent and substantially all of which is capable of receiving liquid to be dispensed, a closure for said receptacle, means forming an outlet through said closure, a partition between said outlet means and said body of liquid defining, with the transparent wall of said receptacle, a chamber, means providing a drip opening for escape of liquid from the receptacle into said chamber so that the liquid flow rate may be observed through the said transparent wall of the receptacle, means connected with said outlet for conveying the liquid to the patient and means for admitting air above the surface of the liquid to allow said liquid to emerge through the drip opening in the form of drops.

3. The combination of a receptacle having a neck portion and a medicinal solution contained therein under vacuum, a stopper for the receptacle, means forming an outlet through said stopper, means forming a partition in said neck portion, said latter means abutting against a wall of the receptacle at a point spaced from said stopper to form a drip chamber, means providing a drip opening for escape of the liquid from the receptacle into said chamber, means forming a part of said neck portion for visualizing the flow rate of said liquid in said chamber and means provided for the admission of air to the interior of said receptacle to allow the solution to flow through the drip opening by gravity.

4. A dispensing apparatus of the type for metering liquids comprising a fluid receptacle having a transparent wall, a closure for said receptacle, means forming an outlet through said closure, means spaced from said outlet upstream thereof and engaging a portion of said wall to form a partition for said liquid when the receptacle is inverted and define a chamber between the said body of liquid and said closure, said means being provided with a nozzle depending into said chamber and forming a part of the closure so that the flow rate of said liquid may be observed through the transparent wall of the receptacle.

5. A dispensing apparatus of the type for metering a body of liquid comprising a fluid receptacle having a transparent neck portion, a closure seated in the mouth of said neck portion, means forming a partition spaced from said outlet means and engaging a wall of said neck portion to form a partition between the said outlet means and the body of liquid when the receptacle is inverted thereby defining a chamber closed at least in part by said wall, means providing a drip opening for escape of the liquid from the receptacle into said chamber so that the liquid flow rate is visible through the said wall and means for admitting air above the body of liquid to allow dropwise flow through the drip opening.

6. A dispensing apparatus of the type for metering liquids comprising a receptacle having an open mouth for a body of liquid to be dispensed and a transparent neck portion, a closure for the mouth of the receptacle, means forming an outlet through said closure, means forming a partition extending across the neck of said receptacle at a point spaced from said closure to define a chamber therebetween, said chamber being closed by a section of the transparent neck portion of the receptacle, means providing a drip opening for escape of the liquid from the receptacle into said chamber whereby the flow rate of the liquid may be observed and means for admitting air above the body of liquid.

ALBERT HALDANE GEE.

REFERENCES CITED

The following references are of record in the file of this patent:

UNITED STATES PATENTS

| Number | Name | Date |
|---|---|---|
| 2,156,313 | Schwab | May 2, 1939 |
| 2,202,163 | Mulford et al. | May 28, 1940 |
| 2,231,418 | Trotter | Feb. 11, 1941 |
| 2,256,657 | Swabacker | Sept. 23, 1941 |
| 2,210,098 | Ravenscroft | Aug. 6, 1940 |
| 2,352,349 | Shaw | June 27, 1944 |
| 1,040,142 | Caraway | Oct. 1, 1912 |
| 2,414,239 | Page | Jan. 14, 1947 |

FOREIGN PATENTS

| Number | Country | Date |
|---|---|---|
| 32,420 | Denmark | Oct. 13, 1923 |